United States Patent [19]

Douglas

[11] 4,104,659
[45] Aug. 1, 1978

[54] PHOTOGRAPHIC APPARATUS HAVING A SPRING DRIVEN MOTOR

[75] Inventor: Lawrence M. Douglas, South Easton, Mass.

[73] Assignee: Polaroid Corporation, Cambridge, Mass.

[21] Appl. No.: 781,724

[22] Filed: Mar. 28, 1977

[51] Int. Cl.$^2$ .............................................. G03B 1/18
[52] U.S. Cl. ..................................... 354/170; 354/83
[58] Field of Search .......................... 354/83, 86, 170; 352/78 C

[56] References Cited

U.S. PATENT DOCUMENTS

| | | | |
|---|---|---|---|
| 2,237,656 | 4/1941 | Covell | 354/170 X |
| 2,591,417 | 4/1952 | Frye | 354/170 |
| 3,653,309 | 4/1972 | Ochiai et al. | 354/170 |
| 3,906,521 | 9/1975 | Ueda | 354/86 |

*Primary Examiner*—Richard A. Wintercorn
*Attorney, Agent, or Firm*—Alfred E. Corrigan

[57] ABSTRACT

Photographic apparatus of the type including a film chamber for locating a film cassette in position for exposure of a film unit contained therein and apparatus for advancing the film unit, subsequent to exposure, away from the exposure position. A spring motor is connected to the apparatus by a power train for driving the latter. The spring motor is wound or energized by a belt having one end connected to and coiled around a shaft of the motor and a second end having a member attached thereto which is normally located in the path of travel that the film cassette takes during its insertion into the film chamber whereby during such insertion the film cassette engages and progressively moves the member on the belt thereby unwinding the belt while simultaneously winding the motor's spring. The energy thus stored in the spring motor is used to drive the apparatus after each exposure. The apparatus driven by the spring motor may take various forms, e.g., a film advancing structure or a pair of rollers for spreading a processing fluid across a photosensitive element of a film unit.

8 Claims, 4 Drawing Figures

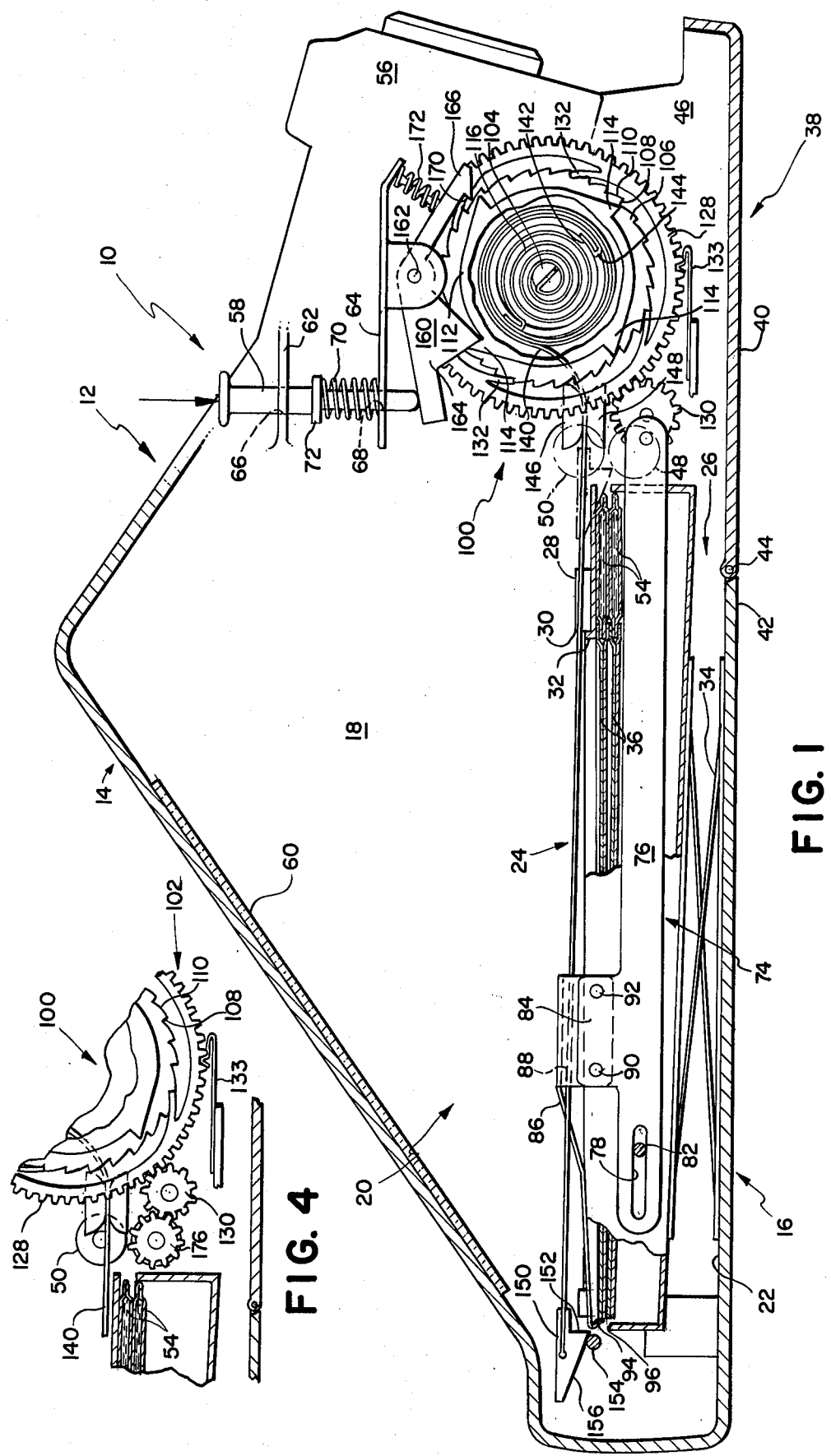

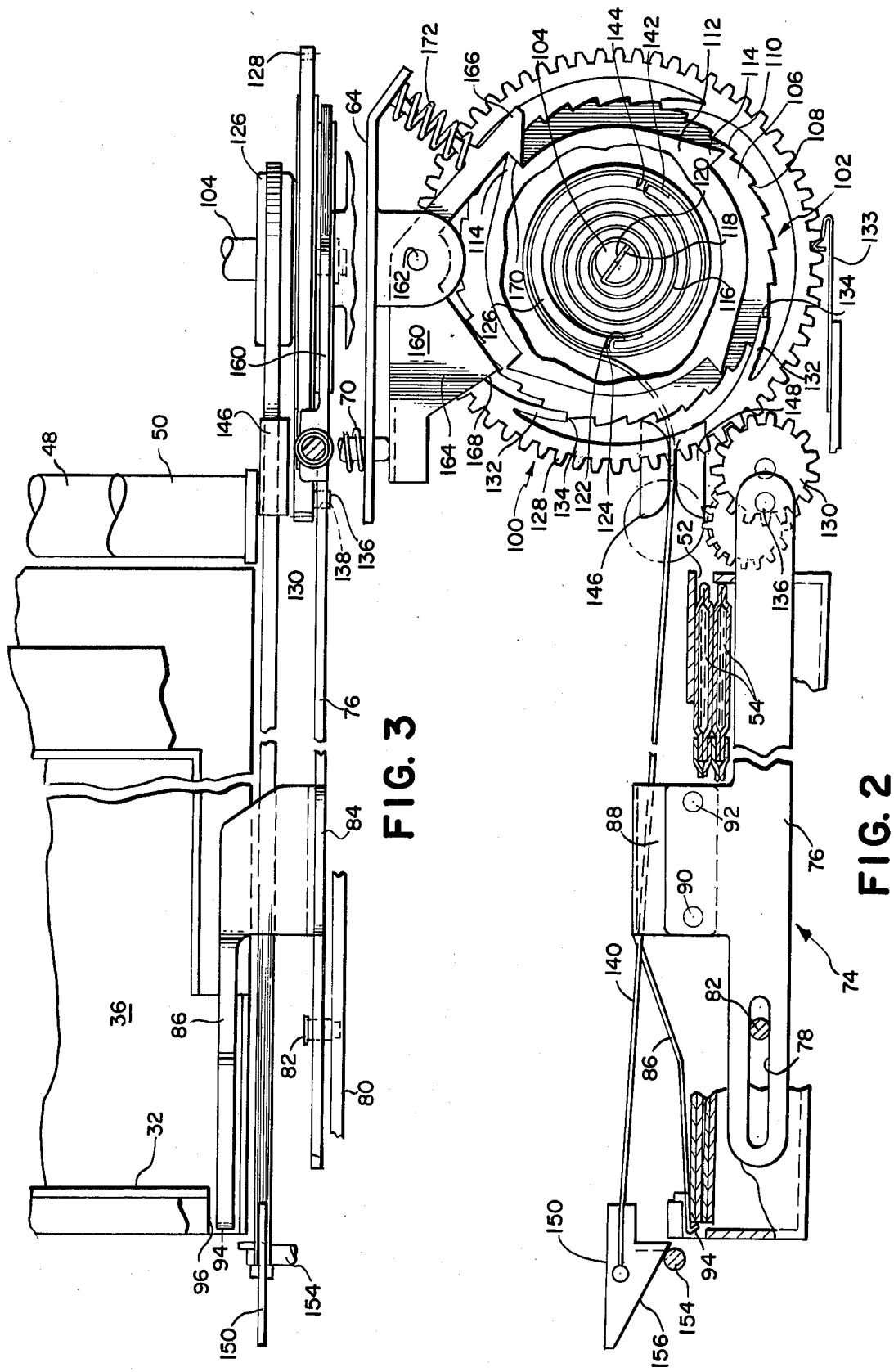

PHOTOGRAPHIC APPARATUS HAVING A SPRING DRIVEN MOTOR

BACKGROUND OF THE INVENTION

1. Field of the Invention

This invention relates to photographic apparatus of the type having a spring motor.

2. Description of the Prior Art

Photographic apparatus of the type having a spring motor are well known in the art. Representative examples of such apparatus are shown for example in U.S. Pat. No. 2,451,820 wherein a manually operable key is provided for winding or energizing a spring motor which is used to drive a pair of processing rollers and a film advancing apparatus; U.S. Pat. No. 3,535,994 wherein manual rotation of a cylinder is effective to wind up the spring of a spring motor which in turn is used to operate a film transport, a shutter, or an indexible flash socket; and U.S. Pat. No. 3,618,493 wherein a spring motor is wound in response to the user of the camera manually retracting a drawer, the energy thus stored in the spring motor being used to drive a pair of processing rollers during the next photographic cycle.

A basic problem with the cameras of the type described in U.S. Pat. Nos. 2,451,820 and 3,535,994 is that one must always remember to wind the spring motor in order to insure that there will be a smooth transition between the exposure of one film unit and the positioning of another film unit in the camera's focal plane. If the operator of one of these cameras fails to wind the spring motor prior to exposing the film unit contained therein there may be a loss of valuable time before the operator can expose another film unit. Similarly, the operator of the camera described in U.S. Pat. No. 3,618,493 must remember that the spring motor has not been charged or wound until the drawer has been returned to its fully retracted position.

SUMMARY OF THE INVENTION

The instant invention relates to photographic apparatus, and more particularly, to a camera having a spring wound motor for operating one or more components of the camera. A major aspect of the invention is a provision for charging or winding the motor's spring in response to the user of the camera loading the camera with a film cassette. More specifically, a preferred embodiment of the camera includes a film chamber for receiving and locating a film cassette in position for exposure of a film unit contained therein, a spring motor having a spring winding belt attached thereto, and a film advancing apparatus coupled to the spring motor for moving the film unit, subsequent to exposure, away from its exposure position. The spring winding belt has a member attached to a free end of the belt and is originally mounted in position to be engaged and moved by the film cassette as it is being inserted into the camera. Movement of the member during insertion of the film cassette is effective to unwind the belt from a drum which forms a part of the spring motor. The unwinding of the belt causes the drum to rotate in a direction which charges or increases the tension in the motor's spring to a degree whereat there is enough energy in the spring motor to drive the film advancing apparatus the requisite number of times to sequentially remove all of the film units from the film cassette. The release of the energy in the spring motor is controlled by a pawl being moved into and out of locking engagement with an escapement like wheel which forms part of the spring motor. The pawl is moved in a first direction during depression of the camera's shutter release button and in a second direction during release of the shutter release button. The construction of the pawl and escapement like wheel is such that the spring motor is effective to drive the film advancing apparatus in a manner which will move the exposed film unit away from its exposure position only when the pawl is moved in the second direction. This aspect of the invention is particularly beneficial when the camera and film units are of the self-developing type since the exposure of the film unit may take place under less than ideal processing temperature conditions and the shutter release button maintained in a depressed condition until the camera has been moved to a location more favorable toward processing of the film unit by the camera's processing rollers. In an alternative embodiment of the invention, the spring motor is used to drive a pair of rollers in a camera of the self-developing type.

An object of the invention is to use the act of loading a film cassette into photographic apparatus of the type having a spring motor to wind the spring of the motor.

Another object of the invention is to increase the energy of a camera's spring motor to a level whereat it can provide the power necessary to sequentially move all of a plurality of film units in a film cassette away from their exposure position, the increase in energy being a result of inserting the film cassette into the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly in section, of photographic apparatus embodying the instant invention;

FIG. 2 is an enlarged elevational view, partially in section, of a portion of the photographic apparatus shown in FIG. 1;

FIG. 3 is a plan view of the apparatus shown in FIG. 2; and

FIG. 4 is an elevational view, partially in section, of a portion of photographic apparatus incorporating an alternative embodiment of the invention.

DETAILED DESCRIPTION OF THE INVENTION

Reference is now made to FIG. 1 of the drawings wherein is shown photographic apparatus in the form of a self-developing type camera 10. The camera 10 includes a plurality of housing sections 12, 14 and 16 interconnected by a pair of side walls 18 (only one of which is shown) to define an exposure chamber 20 and a film cassette chamber 22 for slidably receiving a film cassette 24 through an open end 26 thereof. Suitable means such as a partition plate 28 having an exposure aperture 30 therein coextensive with an exposure aperture 32 in the film cassette 24 and biasing means 34 are provided for supporting and positioning the film cassette 24 in position for exposure of the foremost film unit 36 contained therein. The open end 26 of the film cassette chamber is adapted to be closed by a spread roller housing 38. Roller housing 38 includes a bottom wall 40, extending forwardly of and pivotally coupled to a bottom wall 42 of housing section 16 at hinge 44, and a pair of upwardly extending side walls 46 (only one being shown). Mounted between the side walls 46 are a pair of juxtaposed elongated spread rollers 48 and 50 which extend across substantially the entire width of the open end 26 of the film cassette chamber 22. In FIG. 1, the rollers are mounted in position to receive a film unit 36 as it emerges from the film cassette 24 via opening 52 and spread a processing fluid contained in a pod 54 associated with each film unit across an exposed photosensitive element of the film unit to initiate formation of a visible image in the film unit, while simultaneously advancing the film unit to the exterior of the camera via an opening in housing 38, as is well known in the art. Suitable latch means (not shown) are provided for permitting pivotal movement of the spread roller housing 38 and rollers 48 and 50 to a position wherein the film cassette 24 may be inserted into or removed from the film cassette chamber 22 by way of the opening 26.

The exterior configuration of the camera 10 is completed by a lens and shutter housing 56 which extends forwardly from the housing section 12. The shutter assembly located within the housing section 56 is adapted to be actuated by depressing a shutter release button 58 thereby allowing scene light to enter the exposure chamber 20 wherein it is reflected by a mirror 60 toward the film unit located in position for exposure. The shutter release button 58 is mounted for sliding movement by a pair of plates 62 and 64 having openings 66 and 68 therein for receiving the shank of button 58. A spring 70 encircles the bottom portion of the button's shank and cooperates with the plate 64 and an annular collar 72 on the shank to resiliently urge the button to a position wherein the collar 72 is in engagement with the plate 62.

The camera 10 is provided with film advancing means 74 for engaging an exposed film unit 36 by its trailing end and advancing it, leading edge first, away from its exposure position, through the withdrawal slot 52 in the film cassette 24 and into the bite of the juxtaposed spread rollers 48 and 50. The film advancing means 74 includes a relatively thin, flat, elongate member 76 having an elongate slot 78 therein. The member 76 is adapted to be mounted to a plate 80 by a pin 82 which extends from the plate 80 and through the slot 78 so as to provide for reciprocal movement of the member 76 toward and away from the spread rollers 48 and 50. The member 76 also includes an extension 84 to which a film engaging strap 86 is adapted to be mounted. The strap 86 includes a generally rectangular section 88 formed at a right angle to the remainder of the strap 86 and is connected to the extension 84 by suitable means such as a pair of rivets 90 and 92. The end of the strap 86 opposite to that containing the section 88 terminates in a downwardly extending film engaging portion 94 which is adapted to extend to a position in alignment with an opening 96 in the film cassette's forward and trailing end walls so as to be located just rearwardly of the trailing end of the foremost film unit located within the film cassette 24. The strap is preferably formed from a resilient material such that the film engaging portion 94 will assume the position shown in FIG. 1. Also, it will be noted that the length of the film engaging portion 94 is approximately equal to the thickness of the trailing end section of the film unit thereby precluding the movement of more than one film unit at a time from the cassette.

The camera 10 is preferably provided with an electrical motor (not shown) which is operatively coupled with a battery, which may be located either in the film cassette 24 or in the camera itself, and with various subsystems of the camera, e.g., the roller 48 and/or the exposure control system, for operating the latter. However, in order to reduce the load on the motor and battery the instant invention is provided with a spring wound motor 100, which, in a preferred embodiment of the invention, is adapted to provide the energy for driving the film advancing means 74 in a reciprocating manner so as to advance an exposed film unit away from its exposure position and into the bite of the rollers 48 and 50, as will be more clearly described later.

The spring motor includes a disc-shaped member 102 which is rotatably mounted on a fixed shaft 104. The disc-shaped member 102 is provided with a plurality of gear teeth 106 around the perimeter of the disc-shaped member 102, each tooth having a driving surface 108 and a nondriving surface 110. Extending outwardly from and integral with the disc-shaped member 102 is a ratchet or escapement like wheel 112 having a plurality of teeth 114 spaced around the perimeter thereof. The spring motor 100 is powered by a flat low rate spring 116 which is wound about the fixed shaft 104. The spring has one end 118 secured in a slot 120 in the fixed shaft 104 and its other end 122 secured in a slot 124 formed in an annular collar 126 extending from and integral with the face of disc-shaped member 102 which is opposite to that from which wheel 112 extends.

The spring motor 100 is adapted to be drivingly coupled to the film advancing means 74 by a power train including first and second gears 128 and 130. The first gear 128 includes a plurality of slightly resilient inwardly extending members 132 having terminal ends 134 which are located in the same plane as the gear teeth 106. The second gear 130 includes an outwardly extending pin 136 which is adapted to be received by an aperture 138 in the elongate member 76 for translating the rotary motion of the gear 130 into reciprocating movement of the film advancing means 174.

The spring 116 is charged or wound by a winding means that includes a flat belt 140 having one end 142 secured in a slot 144 in the annular collar 126. The belt 140 then winds about the annular collar 126 a plurality of times before it finally extends between a pair of guides 146 and 148 where its other free end is suitably secured to a member 150. As shown in FIG. 1, the member 150 is normally located within the path that the film cassette takes as it is inserted into the film cassette chamber 22 via the open end 26. When a film cassette is to be loaded into the camera 10, the spread roller housing section 38 is pivoted in a clockwise direction thereby providing access to the film cassette chamber 22. A film cassette is then inserted into the chamber's open end 26, trailing end first (to the left as viewed in FIG. 1). During the initial insertion, the trailing end wall of the film cassette engages a generally vertical wall 152 of the member 150. As the film cassette continues its movement along the path between the open end 26 and its final position adjacent the partition plate 28 it drags the member 150 along with it thereby rotating the annular collar 126 and the disc-shaped member 102 in a counterclockwise manner about the fixed shaft 104. As can be seen from the drawings, the rotation of the disc-shaped member 102 in a counterclockwise manner winds or charges the spring 116. It should be noted at this time that this rotation of the disc-shaped member 102 is not transmitted back through the power train because of the one-way clutch effect created by the nondriving surfaces 110 of the gear teeth 106 sliding past the inwardly facing surfaces of the members 132. Also, means such as a pawl 133 may be provided to insure that the frictional forces between these sliding surfaces will not cause rotation of the gear 128 in a counterclockwise direction. This is important in that if the rotation of the disc-shaped member 102 during loading of the film cassette were permitted to be fed back to the film advancing means 74 it may result in the uppermost element in the film cassette (normally a dark slide when it is a fresh film cassette) being partially moved out of the film cassette as the latter approaches its final position within the film cassette chamber 22. If the film cassette is now secured in its exposure position, as shown in FIG. 1, and the shutter release button were depressed to initiate an exposure cycle, the film engaging portion 94 of the film advancing means 74, when actuated, may not be able to "see," i.e., engage, the trailing end of the uppermost element in the film cassette. Instead, it may "see" the second uppermost element in the film cassette and attempt to move it out of the film cassette while the leading end portion of the uppermost element is located in the film withdrawal slot 52. Since the slot 52 is dimensioned to permit only one element to pass therethrough at a time it can readily be appreciated that the film advancing means 74 may be damaged by this attempt to move the second uppermost element out of the film cassette since it, the second element, cannot leave the film cassette because of the interference of the first element.

A camming pin 154 is mounted within the camera adjacent to the position that the trailing end wall of the film cassette will assume when the latter is finally seated within the camera. The pin 154 is adapted to be engaged by a camming surface 156 on the member 150 as the film cassette enters its final position, said engagement lifting the member 150 out of driven relation with the trailing end wall of the film cassette 24, thereby permitting the belt 140 to be wound upon the annular collar 126 as the energy previously stored in the spring 116 is used to advance the elements including the film units 36 from the film cassette 24.

The release of the energy stored in the spring 116 is controlled by a pawl 160 which is pivotally coupled to the camera at 162. The pawl 160 includes a pair of arms 164 and 166 having surfaces 168 and 170 which are adapted to be moved into and out of latching engagement with the teeth 114 on the escapement like member 112. Suitable spring means 172 are provided for biasing arm 166 in a clockwise direction against the bias of the spring 70 and into latching engagement with one of the teeth 114 thereby preventing rotation of the escapement like member 112 in a clockwise manner under the bias of the spring 116, as shown in FIG. 2. Also, as can be seen in FIG. 2, it should be noted that the spacing between the teeth 114 is greater than that between the surfaces 168 and 170 thereby enabling the shutter release button 58 to be depressed so as to expose the foremost film unit in the film cassette 24 without also activating the film advancing means 74 to the degree necessary to move the exposed film unit away from its exposure position and into the bite of the motor driven spread rollers, as will be further explained hereinafter.

OPERATION OF THE PREFERRED EMBODIMENT

As mentioned hereinbefore, the camera is loaded with a fresh supply of film by rotating the spreader roller housing 38 in a clockwise manner from the position shown in FIG. 1 so as to provide access to the film chamber 22 by way of its open end 26. As the film cassette is inserted through the open end 26 its trailing end engages the member 150 and moves it from the dotted line position shown in FIG. 1 to the solid line position as described hereinbefore. This movement of the member 150 is effective to unwind the belt 140 from the annular collar 126 while simultaneously rotating the annular collar in a counterclockwise direction thereby charging or winding the spring 116. The winding of spring 116 continues until the cassette has been finally located in position for exposure of the forwardmost element therein. Just before the final seating of the film cassette, the camming pin 154 is engaged by the camming surface 156 of the member 150 thereby elevating the latter to a position wherein it is no longer driven by movement of the film cassette. The spread roller housing 38 is then rotated in a counterclockwise direction into the position shown in FIG. 1. Prior to depressing the shutter release button 58, the pawl 160 and the escapement like member 112 are in the position shown in FIG. 2., i.e., the surface 170 of pawl 160 is in engagement with one of the teeth 114 of the escapement like member 112 while the surface 168 of the pawl 160 is spaced from and slightly above the next tooth 114 of the escapement like member. As the shutter release button 58 is depressed it activates the camera's shutter by suitable means (not shown). This downward movement of the shutter release button 58 is also transmitted to the leg 164 of the pawl 160 to rotate it in a counterclockwise direction thereby moving the surface 170 of the pawl out of latching engagement with the tooth 114 while simultaneously moving the surface 168 of the pawl into position to be engaged by another tooth of the engagement like member as the latter rotates through an angle of a few degrees. This smaller angular rotation of the escapement like member 112 is insufficient to transmit sufficient motion to the film advancing means 74 to move the uppermost element in the film cassette away from its exposure position and into the bite of the rollers 48 and 50. FIG. 1 shows the relation between the pawl 160 and the escapement like member 112 after the latter has rotated through a few degrees before being arrested by the surface 168 of the pawl 160. As the operator releases the shutter release button 58, the pawl 160 is rotated in a clockwise direction by the spring 172 thereby moving the surface 168 out of latching engagement with the tooth 114 thereby allowing the escapement like member 112 to be rotated in a clockwise direction until the tooth 114 that was heretofore in engagement with the surface 168 engages the surface 170 on the leg 166 of the pawl, i.e., the escapement like member 112 has been allowed to rotate through an angle slightly less than 90°. The clockwise movement of the escapement like member 112 is transmitted to the gear 128 by reason of the engagement of the driving surface 108 of teeth 106 with the terminal ends 134 of members 132 thereby rotating the gear 128 in a clockwise direction. The latter rotation of the gear 128 through the angle of approximately 90° is sufficient to rotate the gear 130 through an angle of approximately 360° thereby moving the film advancing means 74 and its film engagement portion 94 towards the rollers 48 and 50 thereby moving the uppermost element in the cassette into engagement with the rollers and then returning the film advancing means 74 to its original position shown in FIG. 2. It will be noted that during the clockwise rotation of the escapement like member 112 the flat tape 140 is partially wound upon the latter while the spring 116 is partially unwound. Stated another way, clockwise rotation of the escapement like member 112 is transmitted to the member 150 via the tape 140 to move the member 150 from the solid line position shown in FIG. 1 toward the dotted line position in the same figure. After each subsequent actuation of the shutter release button 58 the spring 116 is incrementally unwound as it releases its energy to drive the film advancing means 74 while simultaneously winding the tape 140 around the escapement like member 112 and moving the member 150 closer to the dotted line position shown in FIG. 1. As stated hereinbefore the distance through which the member 150 is moved by the film cassette 24 is sufficient to impart enough energy to the spring 116 to enable the spring to drive the film advancing means the number of times necessary to enable it to move all of the elements away from their exposure position and into the bite of the rollers 48 and 50.

While the instant invention has been described as one where the spring motor is used to drive a film advancing apparatus, it should be understood that the spring motor may be used to drive other subsystems of the camera. For example, an alternative embodiment of the invention is shown in FIG. 4 of the drawings. In this embodiment the camera's motor may be used to drive the camera's film advancing apparatus while the spring motor 100 is used to drive the roller 48. Specifically, the gear 130 is now meshed with a gear 176 located on one end of the roller 48. When the operator releases the shutter release button 58, clockwise rotation of the escapement like member 112 is transmitted by the gears 128 and 130 to rotate the gear 176 and its coupled roller 48 in a clockwise direction so as to continue the advancement of the exposed film unit away from its exposure position while simultaneously spreading a processing fluid across an exposed photosensitive element of the film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   means for locating a film cassette in position for exposure of a film unit contained therein;
   means, extending between the exterior of said apparatus and said locating means, for defining a path along which the film cassette travels as it is manually moved toward said locating means;
   means for exposing the film unit;
   means for performing a post exposure function associated with the advancement of the exposed film unit from said exposure position;
   a spring motor;
   means for coupling said spring motor to said performing means;
   means coupled to said spring motor for winding said spring motor to increase the energy thereof, said winding means including a member located at a first position within said means for defining a path so as to be engaged and moved by the film cassette toward a second position during movement of the cassette toward said locating means, such movement of said member between said first and second positions being transmitted to said spring motor to wind the latter; and
   means responsive to the actuation of said exposing means for enabling said spring motor to drive said performing means via said coupling means to move the exposed film unit away from said exposure position.

2. Photographic apparatus as defined in claim 1 wherein said performing means includes film advancing means for engaging and advancing the exposed film unit away from said exposure position.

3. Photographic apparatus as defined in claim 2 wherein said spring motor includes a one way clutch connected to said coupling means to prevent the transfer of energy from said spring motor to said coupling means during winding of said spring motor and for driving said coupling means during unwinding of said spring motor.

4. Photographic apparatus as defined in claim 3 wherein said spring motor includes a spring driven escapement member and said enabling means includes a pawl mounted for movement into and out of engagement with said escapement member for controlling the movement thereof, said pawl being mounted in position for movement by said exposing means in a first direction for momentarily freeing said spring driven escapement member for movement through a distance less than that necessary to impart sufficient movement to said film advancing means to advance the exposed film unit away from said exposure position and in a second direction for momentarily freeing said escapement member for movement through a distance sufficient to drive said film advancing means so as to advance the film unit away from said exposure position.

5. Photographic apparatus as defined in claim 4 further including a pair of juxtaposed rollers mounted in position to receive the exposed film unit therebetween as it is advanced away from said exposure position by said film advancing means for spreading a processing fluid across a photosensitive element of the film unit while simultaneously continuing the advancement of the film unit away from said exposure position.

6. Photographic apparatus as defined in claim 1 further including means mounted adjacent said locating means for engaging and for moving said member out of its driven engagement with the film cassette as said member approaches said second position so as to allow said member to return toward said first position as the energy put into said spring motor during said movement of said member from said first position to said second position is depleted.

7. Photographic apparatus as defined in claim 1 wherein the film cassette is adapted to house a plurality of elements including at least one film unit and said movement of said member between said first and second positions is sufficient to charge said spring motor by an amount necessary to drive said performing means the requisite number of times necessary to sequentially advance each of the elements away from said exposure position.

8. Photographic apparatus as defined in claim 1 further including film advancing means and wherein said performing means comprises a pair of juxtaposed rollers mounted in position to receive the exposed film unit therebetween as it is advanced away from said exposure position by said film advancing means for spreading a processing fluid across a photosensitive element of the film unit while simultaneously continuing the advancement of the film unit away from said exposure position.

* * * * *